UNITED STATES PATENT OFFICE.

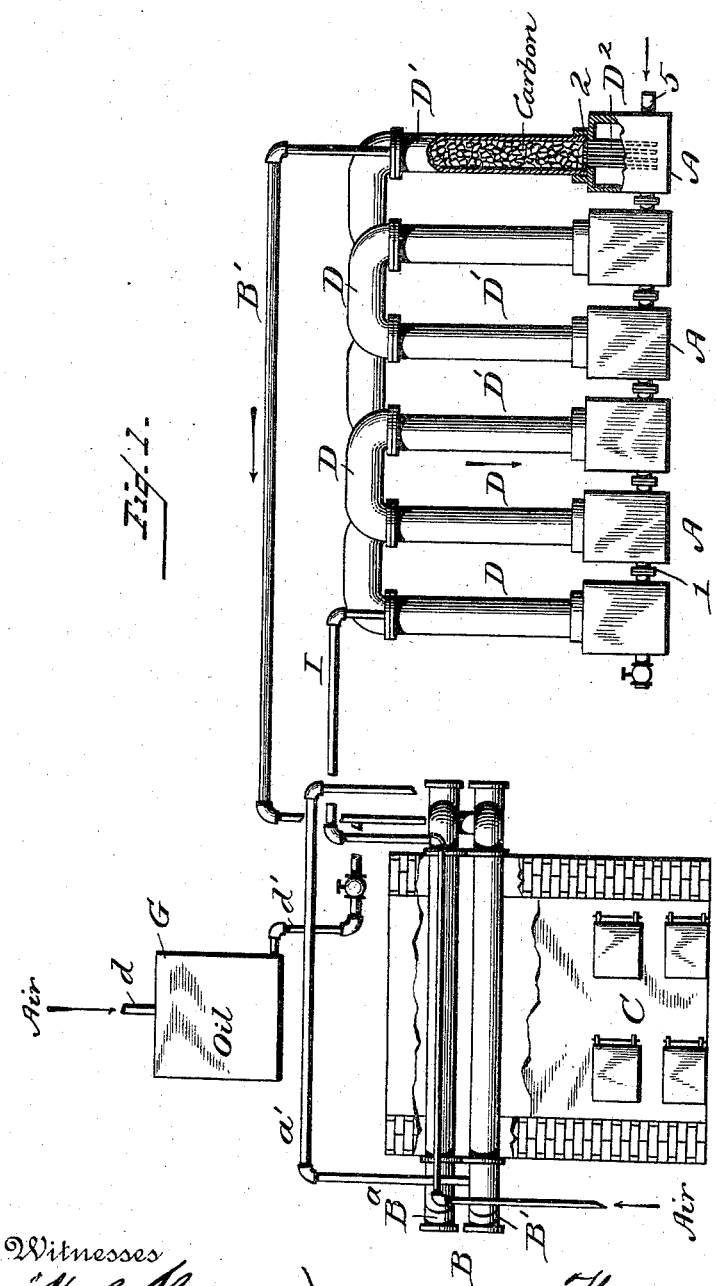

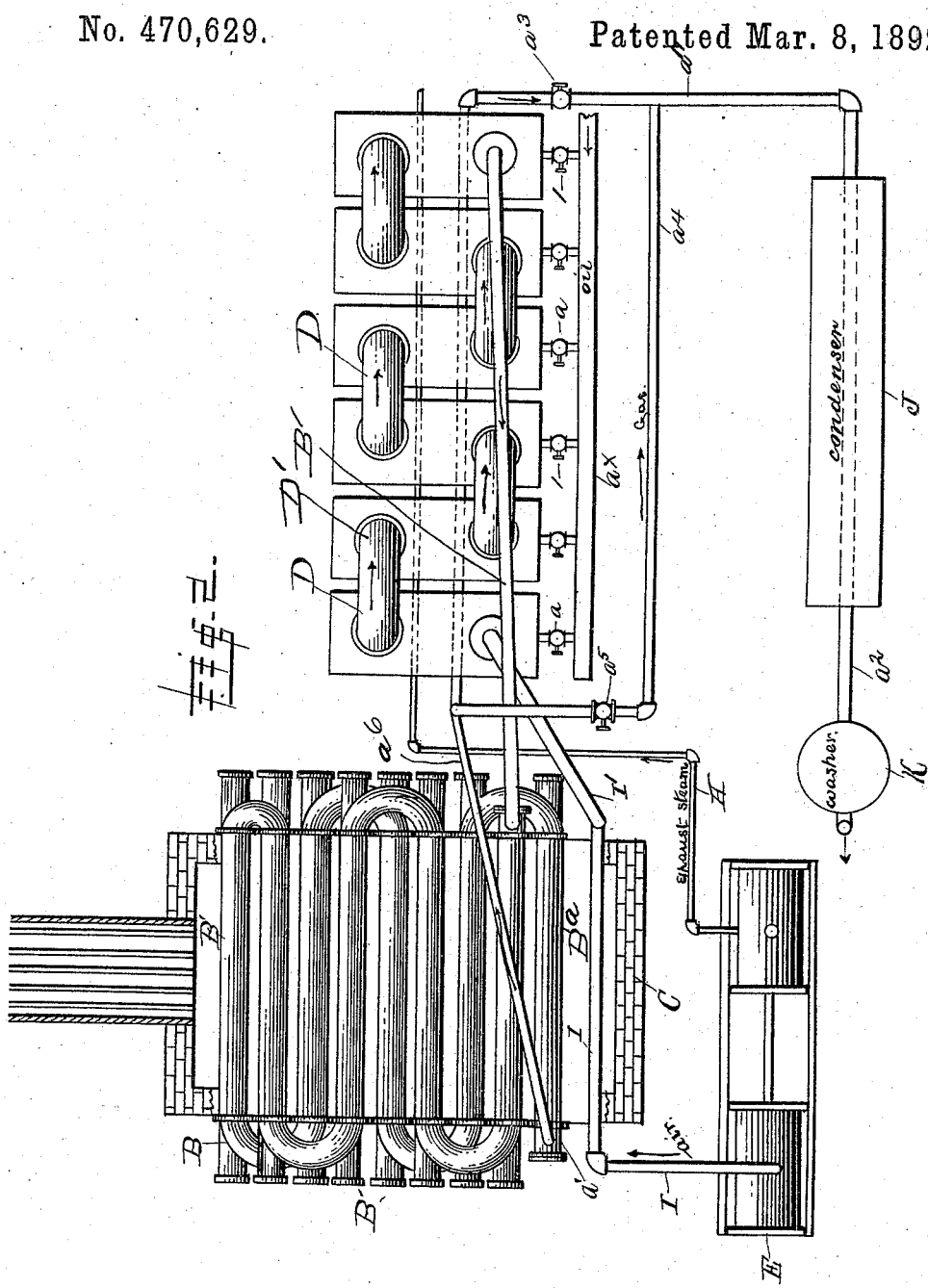

THOMAS H. PAUL, OF FROSTBURG, MARYLAND.

APPARATUS FOR MAKING ILLUMINATING-GAS.

SPECIFICATION forming part of Letters Patent No. 470,629, dated March 8, 1892.

Application filed April 13, 1891. Serial No. 388,737. (No model.)

*To all whom it may concern:*

Be it known that I, THOMAS H. PAUL, a citizen of the United States of America, residing at Frostburg, in the county of Allegany and State of Maryland, have invented certain new and useful Improvements in Apparatus for Manufacturing Illuminating and Heating Gas, of which the following is a specification, reference being had therein to the accompanying drawings.

My invention relates to certain improvements in apparatus for manufacturing illuminating and heating gas; and it has for its object, among other things, to produce in an effective and expeditious manner a pure rich gas; and it consists in the novel combination and arrangement of parts, as will appear from the following description and claims, reference being had to the drawings.

In the accompanying drawings, Figure 1 represents a side elevation, partly in section, of my improved gas apparatus. Fig. 2 is a plan view thereof with the top of the furnace removed exposing the converter, this view also showing the air-compressor, condenser, and washer.

In the embodiment of my invention I employ a series of hydrocarbon tanks or carburetors A, having connected with their lower ends by a series of valved branch pipes $a$ an oil or hydrocarbon feeding pipe $a^x$, connected to the supply-tank. (Not shown.) The valves 1 in the branch pipes provide for regulating the supply of crude oil, which is the form of hydrocarbon I employ, to the respective tanks or carburetors and maintaining it at a proper level therein. The tanks or carburetors A have connected to the tops thereof a series of pipes D D'. These pipes, as clearly shown in the drawings, are of substantially reversed-U shape and are arranged at opposite ends of the tanks, one leg of each section or series connecting at its lower end with the adjacent tank or carburetor of each pair. At the lower end of the section or length of the series of pipes D', down which the air or carbureted air passes, as will presently appear, is a perforated plate 2, which carries a series of depending pipes or tubes $D^2$, which register with the perforations in said plate and extend down to near the bottom of the tank or carburetor below and into the oil therein. By this construction the heated air in its passage through the apparatus passes downwardly through the pipes D' and $D^2$ into and through the crude oil or from end to end of each tank, and then up through the pipes D before passing out of the pipes to the converter, whereby I am enabled to effect the thorough and intimate union of the hydrocarbon and air and the consequent production of a highly-charged carbureted air or gas. The pipes D D' are supplied or charged with charcoal, coke, or other known substance to effect the removal of impurities from the carbureted air or gas in its upward and downward passage therethrough, and also to effect the intimate commingling of the air and the hydrocarbon vapor.

B is the converter, and $B^a$ the enricher. These are arranged in the furnace C, and consist of a series of rectangular pipe-coils, which traverse the entire width of the furnace and are arranged two or more layers deep, the lower tier, which is maintained at a red heat, preferably comprising the greater number of coils of pipe constituting the "gas-fixer," thus providing the maximum heating surface or capacity for the gas in its passage therethrough to effect the thorough "fixing" of the mechanical gas, the upper tier $B^a$ constituting, with the oil-supply tank G, the enricher.

The receiving end of the upper tier of pipe-coils constituting with the oil-supply and its connections the enricher has a pipe connection B' with the most distant end tank or carburetor. To the delivery end of the lower tier or layer of pipe-coils of the converter is connected a hot fixed gas-delivery pipe $a'$, which may either pass through the tanks A to heat the oil therein or may pass directly to the condenser J; but I do not claim this method of heating the oil in the tanks, as the oil in said tanks may be maintained at the required temperature by one or more steam or hot-air pipes either singly or combined passing through said tanks in any suitable manner, said pipes for supplying such heating medium entering at one end of the series, as indicated at 5 and having suitable discharge at the other end. This being a well-known expedient I have not thought it necessary to indicate it fully.

G is an oil-tank, suitably disposed and supported in an elevated position and having an air-pressure pipe connecting at $d$ with the compressor and a valved pipe connection at $d'$ with the upper tier $B^a$ of pipes to enrich the carbureted air or gas in the latter when desired, the supply of oil for enriching the gas being regulated by the valve.

E is an air compressor or pump driven by steam from a suitable boiler (not shown) arranged, preferably, adjacently to and heated by the furnace C. From the steam-chest of the air compressor or pump extends a waste or exhaust steam pipe H, which, as shown, in Fig. 2, passes through the tanks A to heat the oil therein. The compressor E forces air through a pipe I, connecting therewith, and through a stand-pipe $I'$, connecting with the pipe I and with the end tank or carburetor A nearest to the converter, said pipe I passing through the furnace C. This stand-pipe $I'$ may be charged with charcoal or other purifying agent for the removal of impurities from the air passing through the same. The air in its passage through the pipe I is heated to a temperature sufficient to heat the crude oil and thoroughly carburet the air, the degree of temperature to which said air is heated depending upon the density of the oil, which, varying, also necessitates a corresponding variability of the temperature of the air. I make no claim herein to the employment of a specific temperature, as those skilled in the art will in the use of my apparatus readily know how to regulate the temperature of the air according to the density of the oil employed. From the foregoing it will be seen that the air thus forced into the end tank or carburetor nearest the converter will pass down the pipe $D'$, and in a series of comminuted streams through the small pipes or tubes $D^2$ in the bottom of said pipe $D'$ into the oil in said tank, through said oil in said tank to the other end thereof, and from thence to and up the pipe D at the other end of said tank, thence to and down the other leg $D'$ thereof, and through the smaller pipes or tubes $D^2$ in the lower end thereof into the next tank, and so on throughout the series of tanks or carburetors, the carbureted air passing out through the most distant tank as mechanical gas, and from thence being conveyed by pipe $B'$ to the converter, where it is enriched and fixed. In such cases where the hot fixed gas, instead of hot air or steam, as preferred by me, is employed to assist in heating the oil in the tanks, said gas may be passed through a pipe $a^6$. In this arrangement $a^4$ represents a pipe connecting the pipe $a^6$ and the condenser J to permit of the passage of the fixed gas from the converter to the condenser through a pipe $a^2$, connecting the condenser and the scrubber or washer K, from whence it passes through suitable piping to the storage chamber or holder.

The temperature of the tanks may be regulated by any known arrangement of valves controlling the flow of hot air, gas, or steam through pipes passing through the tanks. As before stated, in lieu of passing the hot fixed gas through the tanks, I contemplate passing the exhaust-steam pipe H and also a hot-air pipe therethrough.

When the fixed gas-pipe is passed through the tanks, I have devised an effectual method of regulating the amount of heat imparted thereby to the tanks. In this arrangement I provide a pipe $a^{11}$ with a valve $a^3$ and also with a pipe connection $a^4$ with the hot gas-pipe, which may also have a valve $a^5$. By turning the valve $a^3$ the flow of hot gas through the pipe passing through the tanks will be lessened or entirely cut off, so that either a portion or the entire flow of gas may be diverted from the pipe $a^6$ and passed through the pipe $a^4$.

Although I have shown but one series of tanks or carburetors, it is manifest that two or more of such series may be arranged side by side or the series extended lengthwise, as desired, without departing from my invenvention, suitable known pipe connection being had between the several series.

Having thus described my invention, what I claim is—

1. An apparatus for making illuminating-gas, consisting of a furnace, a series of oil tanks or carburetors, a series of inverted-U-shaped pipes connecting said tanks at their respective ends, the leg of each pipe connection down which the air or gas passes having at its lower portion a plurality of vertical tubes, a heated-air-supply pipe extended through the furnace and connected with the U-shaped pipe adjacent to said furnace, an oil-supply pipe connecting the tanks, a converter located in the furnace, a suitably-located condenser, and a washer and pipes connecting the last carburetor of the series and the converter and also connecting the converter and the condenser and washer, substantially as and for the purpose set forth.

2. An apparatus for making illuminating-gas, consisting of a furnace, a series of oil tanks or carburetors, a series of inverted-U-shaped pipes connecting said tanks at their respective ends, the leg of each pipe connection down which the air or gas passes having at its lower portion a plurality of vertical tubes, a heated-air-supply pipe extended through the furnace and connected with the U-shaped pipe adjacent to said furnace, an oil-supply pipe connecting the tanks, a converter located in the furnace, an oil-supply connected with said converter for the purpose of supplying oil to and enriching the carbureted air in said converter, a suitably-located condenser, and a washer and pipes connecting the last carburetor of the series and the converter and the condenser and washer, substantially as and for the purpose set forth.

In testimony whereof I affix my signature in presence of two witnesses.

THOMAS H. PAUL.

Witnesses:
BENJ. T. WELCH, Jr.,
JOSEF K. HAGMANN.